(12) United States Patent
Ohta

(10) Patent No.: US 11,585,721 B2
(45) Date of Patent: Feb. 21, 2023

(54) DISPLACEMENT COMPONENT DETECTION APPARATUS, DISPLACEMENT COMPONENT DETECTION METHOD, AND COMPUTER-READABLE RECORDING MEDIUM

(71) Applicant: NEC Corporation, Tokyo (JP)

(72) Inventor: Masahiko Ohta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 198 days.

(21) Appl. No.: 16/763,080

(22) PCT Filed: Nov. 14, 2017

(86) PCT No.: PCT/JP2017/040946
§ 371 (c)(1),
(2) Date: May 11, 2020

(87) PCT Pub. No.: WO2019/097578
PCT Pub. Date: May 23, 2019

(65) Prior Publication Data
US 2020/0292411 A1 Sep. 17, 2020

(51) Int. Cl.
G01M 5/00 (2006.01)
G06T 7/00 (2017.01)
G06V 10/25 (2022.01)

(52) U.S. Cl.
CPC ......... *G01M 5/0033* (2013.01); *G06T 7/0002* (2013.01); *G06V 10/25* (2022.01)

(58) Field of Classification Search
None
See application file for complete search history.

(56) References Cited

U.S. PATENT DOCUMENTS

| | | | | |
|---|---|---|---|---|
| 2016/0040984 A1* | 2/2016 | Byrne | ...................... | G06T 7/507 348/92 |
| 2016/0103050 A1* | 4/2016 | Fabrizius | ............... | G01B 11/22 356/630 |

(Continued)

FOREIGN PATENT DOCUMENTS

| | | |
|---|---|---|
| JP | 2003-035528 A | 2/2003 |
| JP | 2004-347585 A | 12/2004 |

(Continued)

OTHER PUBLICATIONS

International Search Report for PCT Application No. PCT/JP2017/040946, dated Jan. 23, 2018.

(Continued)

*Primary Examiner* — Raul J Rios Russo
*Assistant Examiner* — Carl F. R. Tchatchouang
(74) *Attorney, Agent, or Firm* — Sughrue Mion, PLLC

(57) ABSTRACT

A displacement component detection apparatus 10 is provided with: a displacement distribution calculation unit 11 configured to calculate, from time-series images of a measurement target region of an object 30 output from an image capturing device 20 configured to capture the images of the measurement target region, a displacement distribution in a region that corresponds to the measurement target region in the images; a movement amount calculation unit 12 configured to calculate, based on the displacement distribution and image capturing information, a movement amount in the surface direction of the measurement target region and a movement amount in the normal direction of the measurement target region; and a surface displacement calculation unit 13 configured to calculate, from the displacement distribution, a surface displacement component in the measurement target region, using the movement amount in the surface direction of the measurement target region and the movement amount in the normal direction of the measurement target region.

15 Claims, 8 Drawing Sheets

(56) References Cited

U.S. PATENT DOCUMENTS

2017/0227906 A1* 8/2017 Kato ................. G03G 15/6529
2018/0052117 A1 2/2018 Imai

FOREIGN PATENT DOCUMENTS

| | | |
|---|---|---|
| JP | 2006-343160 A | 12/2006 |
| JP | 2008-232998 A | 10/2008 |
| JP | 2012-132786 A | 7/2012 |
| WO | 2016/152075 A1 | 9/2016 |
| WO | 2017/179535 A1 | 10/2017 |
| WO | WO-2018159003 A1 * | 9/2018 ............. E01C 23/01 |

OTHER PUBLICATIONS

Z. Wang, et al., "Crack-opening displacement estimation method based on sequence of motion vector field images for civil infrastructure deterioration inspection", Image Media Processing Symposium (PCSJ / IMPS 2014), I—Jan. 17, 2014, Japan.

Yoneyama, Satoru et al. Noncontact Deflection Distribution Measurement of Bridges Using Digital Image Correlation Journal of the Japanese Society of Non-Destructive Inspection, Mar. 2006, vol. 55, No. 3, pp. 119-125, Japa.

English translation of Written opinion for PCT Application No. PCT/JP2017/040946, dated Jan. 23, 2018.

* cited by examiner

DISPLACEMENT COMPONENT DETECTION APPARATUS, DISPLACEMENT COMPONENT DETECTION METHOD, AND COMPUTER-READABLE RECORDING MEDIUM

This application is a National Stage Entry of PCT/JP2017/040946 filed on Nov. 14, 2017, the contents of all of which are incorporated herein by reference, in their entirety.

TECHNICAL FIELD

The present invention relates to a displacement component detection apparatus and a displacement component detection method for detecting a displacement component on the surface of an object such as a structure, and further relates to a computer-readable recording medium where a program for realizing these is recorded.

BACKGROUND ART

In concrete structures such as tunnels and bridges, defects such as cracks, peeling and internal cavities ordinarily occur due to aging. Because such defects affect the deterioration state of a structure, it is necessary to accurately detect these defects in order to accurately judge the deterioration state of the structure.

However, conventionally, detection of defects such as cracks, peeling, and internal cavities of a structure has been performed by visual inspection and hammering inspection by an inspector, and it is necessary for the inspector to approach the structure to perform inspection. Therefore, with a conventional defect detection technique, it is necessary to prepare an environment in which work can be performed in the air near the structure, for example by preparing vehicles such as aerial work vehicles and bridge inspection vehicles or creating a scaffold, and therefore the cost of performing work is high. Also, traffic regulation may be required to prepare the working environment, and in this case, there is a problem that economic opportunities are lost. Therefore, technology is sought that enables a defect in a structure to be detected remotely.

As technology for remotely detecting a defect in a structure, technology for detecting a defect using a captured image of the structure has been proposed (for example, see Patent Documents 1 to 4). Specifically, Patent Document 1 discloses technology in which a binarization process is performed at a predetermined threshold on an image of a structure obtained by image capturing with an image capturing device, and based on this image converted to binary values, an image corresponding to a crack occurring on a surface of the structure is detected.

Patent Document 2 discloses technology in which a thermal image of a structure is captured with an infrared camera, a change in the temperature distribution of the structure is measured, and a stress change is detected based on the measured change in the temperature distribution. Patent Document 3 discloses technology in which floating and cracks on a tunnel wall face are detected with a line sensor using infrared rays and a laser distance meter. Further, Patent Document 4 discloses technology in which distortion is measured at a plurality of locations of an object using a plurality of image capturing devices.

Thus, according to the technology disclosed in Patent Documents 1 to 4, it is not necessary for an inspector to approach the structure and perform visual inspection and inspection by hammering, but rather it is sufficient to only capture an image of the structure, so a defect in the structure can be detected remotely.

In recent years, technology has also been proposed in which a defect or the like of a structure is remotely detected by capturing movement or displacement of the surface of the structure with an image (for example, see Patent Documents 5 and 6, and Non-Patent Document 1). Specifically, Patent Document 5 discloses technology in which a displacement amount of the structure is calculated based on a captured image before a load is applied and a captured image after a load is applied. Non-Patent Document 1 discloses a technique in which a displacement distribution of the surface of the structure is calculated based on a captured image before a load is applied and a captured image after a load is applied, and by detecting a characteristic movement that occurs in the vicinity of a crack when a load is applied (opening/closing behavior of the crack), the crack itself is accurately detected.

Here, a case is described where the technology disclosed in Patent Documents 5 and 6 is applied to a bridge. In the case of a bridge, when a vehicle passes over the bridge, deformation occurs due to that load, and distortion and displacement occur in floor slabs and girders. Therefore, when detecting defects using movement or displacement of the surface of floor slabs and girders or the like of a bridge, an image capturing device is arranged, for example, under the bridge, and the image capturing device captures an image of a lower face of the floor slabs and girders of the bridge.

Also, Patent Document 6 discloses technology in which movement in the vertical direction and vibration of the structure itself are corrected in order to more accurately obtain a displacement distribution of the surface of the structure. Accordingly, when the technology disclosed in Patent Document 6 is applied to a bridge, a defect such as a crack can be accurately detected.

In other words, when a vehicle passes over a bridge, deformation occurs due to that load, and also, deflection occurs, and as a result the structure moves in the vertical direction and vibrates. Therefore, the distance between the lower face, which is the image capturing target, and the image capturing device fluctuates, which also affects the displacement distribution calculated based on a captured image. On the other hand, when the technology disclosed in Patent Document 6 is used, the displacement of the surface can be corrected in consideration of that influence, so a defect such as a crack that occurs in the bridge can be accurately detected.

LIST OF RELATED ART DOCUMENTS

Patent Documents

Patent Document 1: Japanese Patent Laid-Open Publication No. 2003-035528

Patent Document 2: Japanese Patent Laid-Open Publication No. 2008-232998

Patent Document 3: Japanese Patent Laid-Open Publication No. 2004-347585

Patent Document 4: Japanese Patent Laid-Open Publication No. 2012-132786

Patent Document 5: Japanese Patent Laid-Open Publication No. 2006-343160

Patent Document 6: International Patent Laid-Open Publication No. WO2016-152075

Non-Patent Documents

Non-Patent Document 1: Z. Wang, et al., "Crack-opening displacement estimation method based on sequence of motion vector field images for civil infrastructure deterioration inspection", Image Media Processing Symposium (PCSJ/IMPS 2014), I-1-17, 2014.

SUMMARY OF INVENTION

Problems to be Solved by the Invention

Incidentally, in an actual bridge, when a vehicle passes over the bridge and a load is applied, the bridge itself, which is a structure, moves and vibrates in a three-dimensional direction. At the same time, a load due to wind or the like may be applied to cause rolling. In other words, in an actual bridge, not only movement and vibration in the vertical direction such as deflection, but also movement and vibration in a surface direction of a plane (a plane formed by a main girder and a horizontal girder) perpendicular to the vertical direction, occurs.

The movement of the bridge itself in the vertical direction and in the surface direction of the plane perpendicular to the vertical direction may be several times to several hundred times larger than characteristic movement that occurs in the vicinity of defects such as cracks formed on the surface of the girders and floor slabs of the bridge. Therefore, in order to accurately detect a defect based on the characteristic movement that occurs in the vicinity of these defects, it is necessary to detect a displacement component of the surface by removing the displacement component that occurs due to movement in the vertical direction and in the surface direction of the plane perpendicular to the vertical direction, that is, movement in three dimensions of the bridge itself, from the displacement distribution of the structure surface.

However, with the technology disclosed in above Patent Documents 1 to 5 and Non-Patent Document 1, such movement of the object itself is not considered, so it is difficult to accurately detect the displacement component of the structure surface. As a result, it is difficult to detect a defect in the structure.

Also, according to the technology disclosed in above Patent Document 6, it is possible to correct the influence when movement in the vertical direction of the structure itself occurs. However, even with this technology, the movement and vibration in the surface direction of the plane perpendicular to the vertical direction are not corrected. When movement and vibration in the vertical direction and movement and vibration in the surface direction of the plane perpendicular to the vertical direction are occurring mixed together, in the measurement using an image, ordinarily the amount of displacement due to movement and vibration in the surface direction of the plane perpendicular to the vertical plane is larger and therefore is dominant. As a result, it is difficult to accurately detect movement and vibration in the vertical direction, so the correction accuracy is low, and it is difficult to accurately detect the displacement component of the structure surface.

An example object of the invention is to provide a displacement component detection apparatus, a displacement component detection method, and a computer-readable recording medium that address the above-described problems, such that it is possible, in an object that involves movement in a three-dimensional direction and vibration, to detect a displacement component of a surface of the object with influence due to this movement and vibration eliminated.

Means for Solving the Problems

In order to achieve the example object described above, a displacement component detection apparatus according to an example aspect of the invention includes:

a displacement distribution calculation unit configured to calculate, from time-series images of a measurement target region of an object output from an image capturing device configured to capture the images of the measurement target region, a displacement distribution in a region that corresponds to the measurement target region in the images;

a movement amount calculation unit configured to calculate, based on the displacement distribution and image capturing information when capturing the measurement target region, a movement amount in a surface direction of the measurement target region and a movement amount in a normal direction of the measurement target region; and a surface displacement calculation unit configured to calculate, from the displacement distribution, a surface displacement component in the measurement target region, using the movement amount in the surface direction of the measurement target region and the movement amount in the normal direction of the measurement target region.

Also, in order to achieve the example object described above, a displacement component detection method according to an example aspect of the invention includes:

(a) a step of calculating, from time-series images of a measurement target region of an object output from an image capturing device configured to capture the images of the measurement target region, a displacement distribution in a region that corresponds to the measurement target region in the images;

(b) a step of calculating, based on the displacement distribution and image capturing information when capturing the measurement target region, a movement amount in a surface direction of the measurement target region and a movement amount in a normal direction of the measurement target region; and (c) a step of calculating, from the displacement distribution, a surface displacement component in the measurement target region, using the movement amount in the surface direction of the measurement target region and the movement amount in the normal direction of the measurement target region.

Furthermore, in order to achieve the example object described above, a computer-readable recording medium according to an example aspect of the invention includes a program recorded thereon, the program including instructions that cause a computer to carry out:

(a) a step of calculating, from time-series images of a measurement target region of an object output from an image capturing device configured to capture the images of the measurement target region, a displacement distribution in a region that corresponds to the measurement target region in the images;

(b) a step of calculating, based on the displacement distribution and image capturing information when capturing the measurement target region, a movement amount in a surface direction of the measurement target region and a movement amount in a normal direction of the measurement target region; and (c) a step of calculating, from the displacement distribution, a surface displacement component in the measurement target region, using the movement amount in the surface direction of the measurement target region and the movement amount in the normal direction of the measurement target region.

Advantageous Effects of the Invention

As described above, according to the invention, it is possible, in a structure that involves movement in a three-dimensional direction and vibration, to detect a displacement distribution of an object surface with influence due to this movement and vibration eliminated.

EXAMPLE EMBODIMENT (Example Embodiment)

Following is a description of a displacement component detection apparatus, a displacement component detection method, and a program according to an example embodiment of the invention, with reference to FIGS. 1 to 8.

[Apparatus Configuration]

Figure 1:
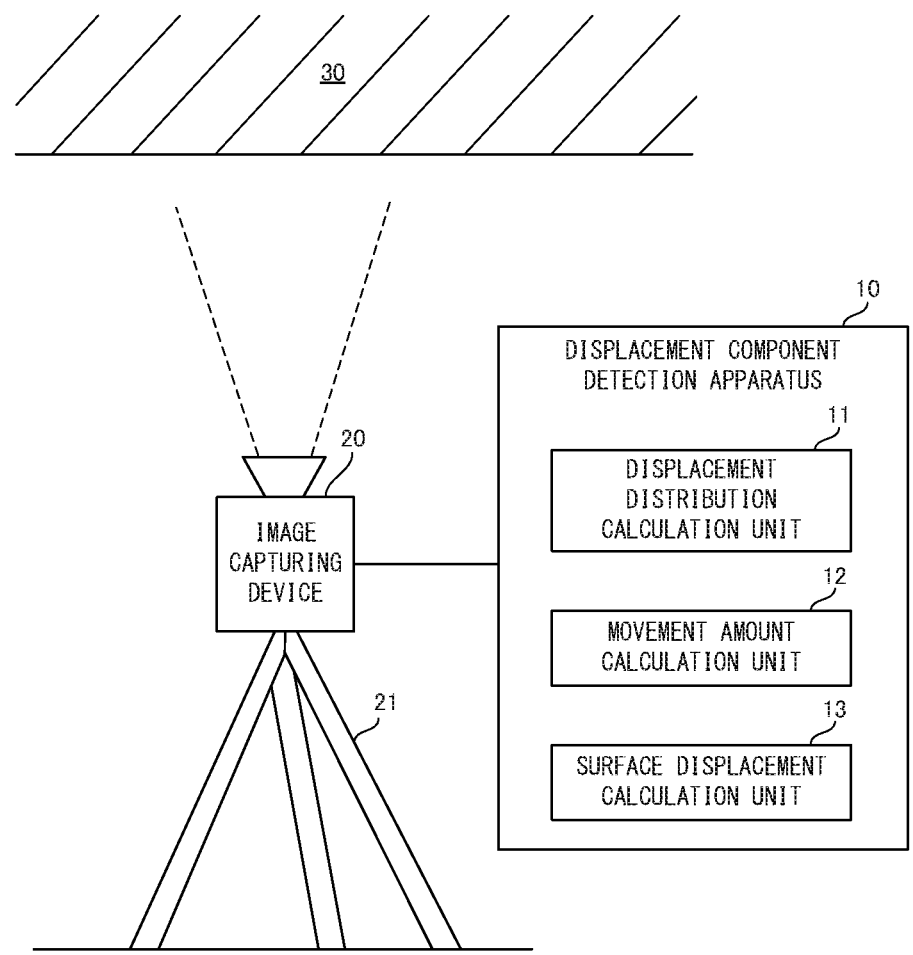
FIG. 1 is a block diagram showing a schematic configuration of a displacement component detection apparatus according to an example embodiment of the invention.

First, the schematic configuration of a displacement component detection apparatus according to this example embodiment will be described with reference to FIG. 1. FIG. 1 is a block diagram showing a schematic configuration of a displacement component detection apparatus according to an example embodiment of the invention.

As shown in FIG. 1, a displacement component detection apparatus 10 according to this example embodiment is an apparatus for determining the state of an object 30. As shown in FIG. 1, the displacement component detection apparatus 10 includes a displacement distribution calculation unit 11, a movement amount calculation unit 12, a surface displacement calculation unit 13, and a deterioration state determination unit 14.

The displacement distribution calculation unit 11 is configured to calculate, from time-series images of a measurement target region of an object 30 that are output from an image capturing device 20 configured to capture the images of the measurement target region, a displacement distribution in the measurement target region. The movement amount calculation unit 12 is configured to calculate, based on the displacement distribution in the measurement target region calculated by the displacement distribution calculation unit 11, and image capturing information when capturing the measurement target region, a movement amount in a surface direction of the measurement target region and a movement amount in a normal direction of the measurement target region.

The surface displacement calculation unit 13 is configured to calculate, from the displacement distribution calculated by the displacement distribution calculation unit 11, a surface displacement component in the measurement target region, using the movement amount in the surface direction of the measurement target region and the movement amount in the normal direction of the measurement target region.

In this example embodiment, examples of the object 30 include a structure that moves in a three-dimensional direction by receiving an external force or vibrates by receiving an external force, such as a bridge for example. In this case, in order to accurately detect the displacement component of the object 30, it is necessary to eliminate movement in a three-dimensional direction and vibration of the object 30 itself due to an external force.

On the other hand, in the displacement component detection apparatus 10, from the displacement distribution calculated from the time-series images of the measurement target region of the object 30, the surface displacement component in the measurement target region is calculated according to the movement amount in the surface direction and the movement amount in the normal direction of the measurement target region. That is, according to this example embodiment, from the displacement distribution, it is possible to obtain a displacement component including a slight movement or displacement of the surface of the object 30 (hereinafter also referred to as a "surface displacement component"), with movement in a three-dimensional direction and vibration eliminated. Also, by determining an object deterioration state based on the distribution (hereinafter also referred to as a "surface displacement distribution") of the surface displacement component obtained in this way, it is possible to accurately determine the deterioration state of the object 30.

Figure 2:
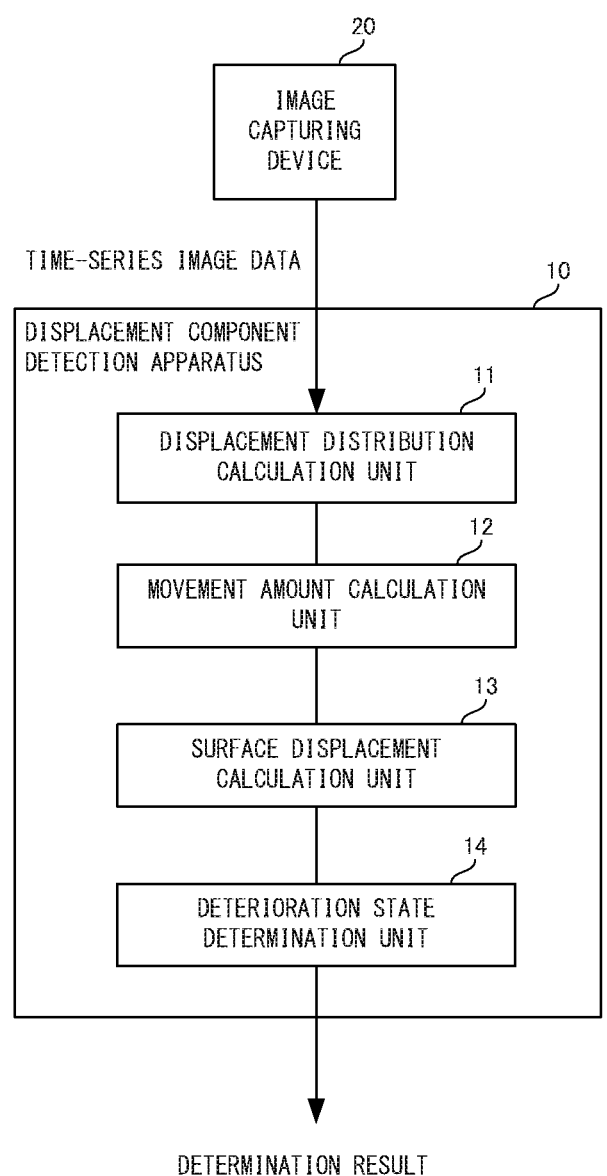
FIG. 2 is a block diagram specifically showing the configuration of the displacement component detection apparatus according to an example embodiment of the invention.

Next, the configuration and function of the displacement component detection apparatus 10 according to this example embodiment will be described specifically with reference to FIG. 2. FIG. 2 is a block diagram specifically showing the configuration of the displacement component detection apparatus according to an example embodiment of the invention.

First, in this example embodiment, a measurement target region to be image-captured by the image capturing device 20 is a region to be measured for the surface displacement component and the surface state in the object 30. Examples of the measurement target region include a region of, for example, the lower face of a girder or a floor slab of a bridge (see FIG. 1). The measurement target region is not limited to a region perpendicular to the vertical direction, such as a girder or a floor slab of a bridge. The measurement target region may also be a region that forms a certain angle with respect to the vertical direction (such as a girder or a floor slab of a ramp or the like that is inclined with respect to or the ground or a pier), or a region that is parallel to the vertical direction (a region of a side face of a structure). Furthermore, the measurement target region may be a region of an accessory (such as piping, a signboard, or lighting) of the object 30.

Also, in this example embodiment, the object 30 is not limited to the above-described structure such as a bridge, but may be any structure that involves movement in a three-dimensional direction or vibration. For example, the object 30 may be a test specimen used in a load loading test. Also, the object 30 may be configured with a composite member such as reinforced concrete, or may be configured with a single member such as steel.

In this example embodiment, the image capturing device 20 is arranged such that the normal vector of a light-receiving face of a solid-state image capturing element of the image capturing device 20 is parallel to the normal vector of the measurement target region, and the horizontal direction and the perpendicular direction of the time-series images are parallel to the surface direction of the measurement target region. Also, "the surface direction of the measurement target region" means a direction parallel to a plane formed by the measurement target region.

Specifically, in the example shown in FIG. 1, the image capturing device 20 is arranged on the ground or the like through a fixture 21 such that the light-receiving face is parallel to the measurement target region. In this example embodiment, the horizontal direction of the time-series images is an X direction, the perpendicular direction of the time-series images is a Y direction, and the normal direction (vertical direction) of the measurement target region is a Z direction. It is sufficient that the fixture 21 has a function of fixing the image capturing device 20 so as to not move, and may specifically be a tripod or the like.

In this example embodiment, the displacement distribution calculation unit 11 acquires time-series images output by the image capturing device 20, sets an image captured at any time as a reference image, and sets the other images as processing images. Then, the displacement distribution calculation unit 11 searches in each processing image for a corresponding position in the processing image for each point of a region (hereinafter, referred to as a "specific region") corresponding to the measurement target region in the reference image, and calculates displacement. By repeating this for each processing image, a distribution of displacement with respect to the specific region is calculated for each processing image.

Specifically, the displacement distribution calculation unit 11 searches for a location (coordinates) in the processing image that is most similar to a location (coordinates) in the specific region, and calculates the displacement of the specified location (coordinates). As a technique of specifying a similar location, for example, there is a technique of searching for a position (coordinates) with the highest correlation using a similarity correlation function such as SAD (Sum of Squared Difference), SSD (Sum of Absolute Difference), NCC (Normalized Cross-Correlation), or ZNCC (Zero-means Normalized Cross-Correlation), using luminance values of a certain location (coordinates) and its surrounding coordinates.

Also, the most similar location can be specified, using a similarity correlation function between the location (coordinates) with the highest correlation and a portion at a position (coordinates) to the front, rear, left, and right of that location, by applying a technique such as linear fitting, curve fitting, or parabolic fitting. In this case, it is possible to more accurately calculate the position (coordinates) of a similar region with sub-pixel precision.

By repeatedly performing such calculation processing for each of the coordinates in the specific region, it is possible to obtain a distribution of displacement for the specific region in the processing image. Also, by performing similar processing for each processing image, it is possible to obtain a displacement distribution for a specific region in each processing image.

Based on the displacement distribution calculated by the displacement distribution calculation unit 11 and the image capturing information, the movement amount calculation unit 12 calculates a movement amount ($\Delta X$, $\Delta Y$) in the surface direction of the measurement target region, and a movement amount ($\Delta Z$) in the normal direction. The image capturing information includes at least the size of one pixel of the solid-state image capturing element, the focal length of the lens, the imaging distance from the image capturing device 20 to the measurement target region (strictly speaking, indicating the distance from the principal point of the lens to the measurement target region), and the shooting frame rate.

Figure 3:
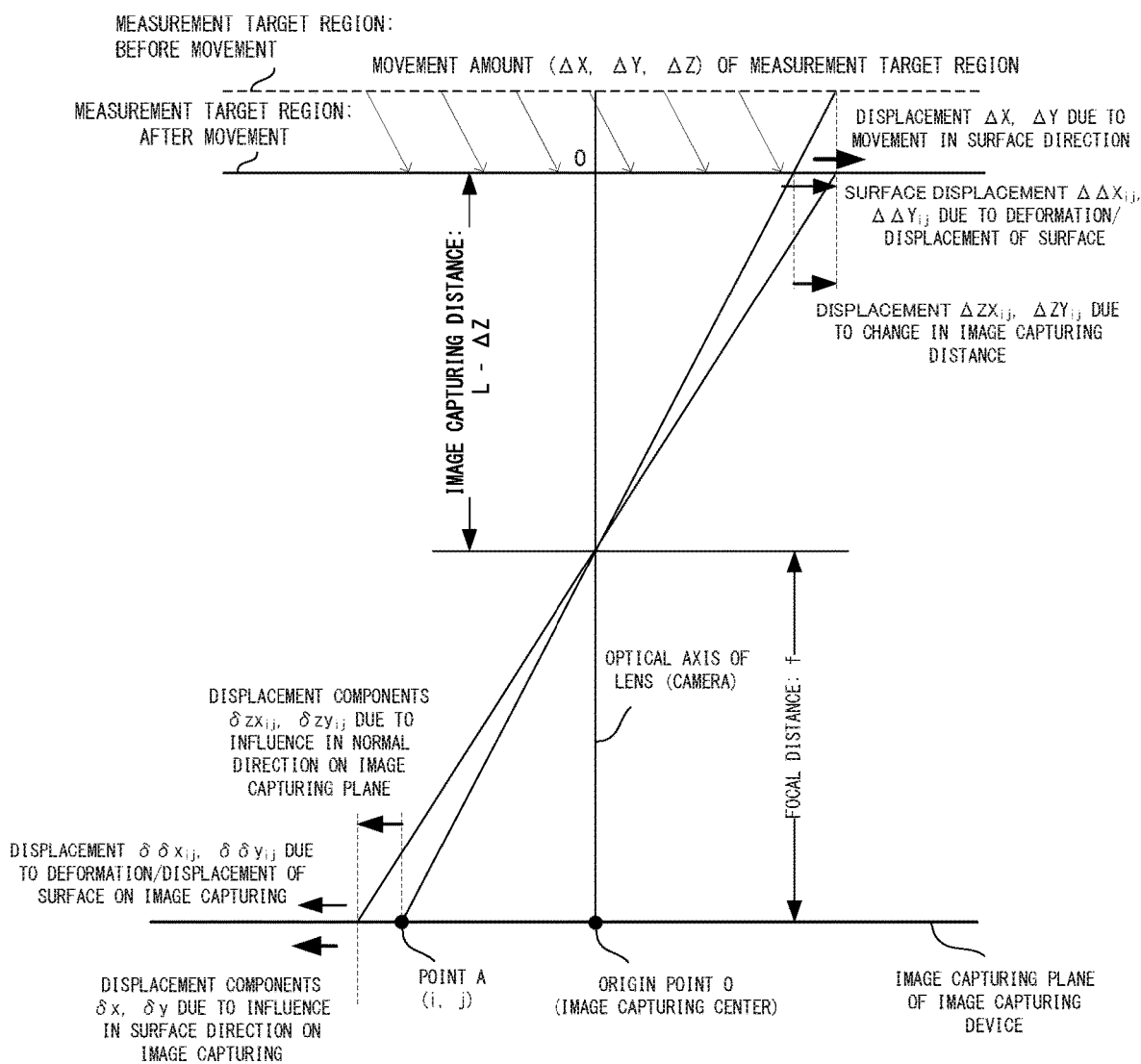
FIG. 3 illustrates components included in a displacement observed on an imaging plane of an image capturing device 20 at a certain point when an image of a measurement target region of a structure is captured.

Before describing the details of operation of the movement amount calculation unit 12, what sort of displacement components are included in the displacement calculated by the displacement distribution calculation unit 11 will be described with reference to FIGS. 3 and 4. FIG. 3 illustrates components included in a displacement observed on the imaging plane of the image capturing device 20 at a certain point when an image of a measurement target region of a structure is captured. FIG. 3 shows a state in which the measurement target region has moved in a three-dimensional direction by a movement amount ($\Delta X$, $\Delta Y$, $\Delta Z$) before and after a bridge serving as the object 30 moves due to receiving some load. Here, a coordinate system is considered that has an origin at the center of the imaging plane of the image capturing device 20, that is, a point corresponding to the imaging center, which is the intersection of the optical axis of the lens and the imaging plane. In this coordinate system, the observed displacement ($\delta x_{ij}$, $\delta y_{ij}$) at a point A of coordinates (i, j) on the imaging plane of the image capturing device 20 is considered. Note that the coordinates (i, j) on the imaging plane of the image capturing device 20 may be replaced with the coordinates on the captured image.

In the state shown in FIG. 3, in the measurement target region of the object 30, movement amounts ($\Delta X$, $\Delta Y$, $\Delta Z$) occur in the horizontal direction and the perpendicular direction (X and Y directions) and the normal direction (Z direction) on the screen. The measurement target region moves parallel to the imaging plane of the image capturing device 20 by an amount ($\Delta X$, $\Delta Y$) moved in the horizontal direction and the perpendicular direction (X and Y directions) in the screen. Also, the measurement target region approaches the image capturing device 20 by an amount ($\Delta Z$) moved in the normal direction (Z direction). Therefore, the imaging distance is shortened by the movement amount $\Delta Z$.

Then, as shown in FIG. 3, a displacement $\delta zx_{ij}$ due to the movement amount $\Delta Z$ occurs separately from the displacement $\delta x$ caused by the movement amount $\Delta X$ of the measurement target region in the horizontal direction (X direction) with respect to the imaging plane of the image capturing device 20. Similarly, a displacement $\delta zy_{ij}$ due to the movement amount $\Delta Z$ also occurs in the imaging plane of the image capturing device 20 separately from the displacement δy caused by the movement amount ΔY of the image capturing device 20 in the perpendicular direction (Y direction) with respect to the screen.

Also, when deformation or displacement ($\Delta\Delta X_{ij}$, $\Delta\Delta Y_{ij}$) occurs on the surface of the measurement target region due to the object 30 receiving some load, surface displacement components ($\delta\delta x_{ij}$, $\delta\delta y_{ij}$) also overlap on the imaging plane of the image capturing device 20. Here, the surface displacement components ($\delta\delta x_{ij}$, $\delta\delta y_{ij}$) that accompany the deformation and displacement of the surface of the measurement target region are as follows. For example, in a healthy region without defects such as cracks, the surface displacement changes continuously. On the other hand, in a region straddling a crack, the displacement of the surface does not change continuously but changes discontinuously. As described above, the characteristic feature is that the distribution of surface displacement is different between a healthy region where there is no defect and a region where there is some defect.

These displacement components are all independently added and observed as a combined vector. That is, the displacement ($\delta x_{ij}$, $\delta y_{ij}$) observed at point A can be represented by the following equations 1 and 2, as shown in FIG. 4 described below.

$$(\delta x_{ij}, \delta y_{ij}) = \quad \text{[Equation 1]}$$
$$[\text{displacement components } (\delta x, \delta y) \text{ that accompany}$$
$$\text{movement } (\Delta x, \Delta y) \text{ in the surface direction}] +$$
$$[\text{displacement components } (\delta z x_{ij}, \delta z y_{ij})$$
$$\text{that accompany movement}$$
$$(\Delta z) \text{ in the normal direction}] +$$
$$[\text{surface displacement components } (\delta\delta x_{ij}, \delta\delta y_{ij})]$$

$$(\delta x_{ij}, \delta y_{ij}) = (\delta x + \delta z x_{ij} + \delta\delta x_{ij}, \delta y + \delta z y_{ij} + \delta\delta y_{ij}) \quad \text{[Equation 2]}$$

Here, assuming that the imaging distance from the principal point of the lens to the measurement target region is L, the lens focal length of the image capturing device 20 is f, and the coordinates from the imaging center are (i, j), the displacement components ($\delta x$, $\delta y$) that accompany the movement ($\Delta x$, $\Delta y$) in the surface direction of the object 30, and the displacement components ($\delta z x_{ij}$, $\delta z y_{ij}$) that accompany the movement ($\Delta z$) in the normal direction, are expressed by the following Equations 3 and 4, respectively.

$$(\delta x, \delta y) = \left(\frac{f}{L-\Delta z}\Delta x, \frac{f}{L-\Delta z}\Delta y\right) \quad \text{[Equation 3]}$$

$$(\delta z x_{ij}, \delta z y_{ij}) = \left(f\left(\frac{1}{L-\Delta z}-\frac{1}{L}\right)i, f\left(\frac{1}{L-\Delta z}-\frac{1}{L}\right)j\right) \quad \text{[Equation 4]}$$

Assuming that all measurement target regions make the same three-dimensional movement, it is understood that the displacement components ($\delta x$, $\delta y$) accompanying the movement ($\Delta x$, $\Delta y$) in the surface direction indicated by the above Equations 3 and 4 are constant regardless of the coordinates of point A. Also, it is understood that the displacement components ($\delta z x_{ij}$, $\delta z y_{ij}$) accompanying the movement ($\Delta z$) in the normal direction become larger as the coordinates of point A become farther from the origin point. On the other hand, the surface displacement components ($\delta\delta x_{ij}$, $\delta\delta y_{ij}$) of the measurement target region indicate a continuous/discontinuous displacement distribution according to the position of a defect such as a crack on the surface, regardless of the coordinates of point A.

Figure 4:
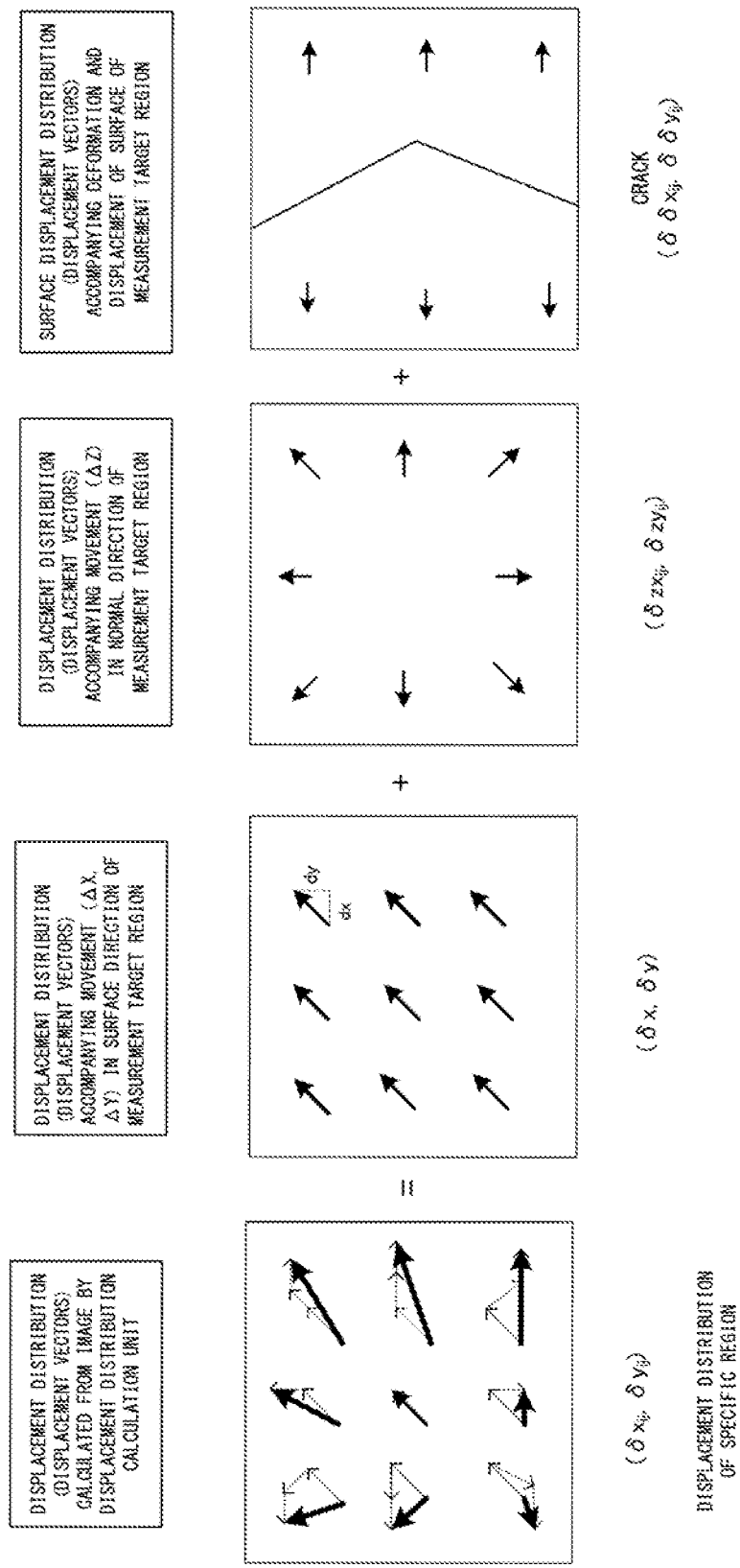
FIG. 4 schematically illustrates a two-dimensional spatial distribution of displacement components ($\delta x_{ij}$, $\delta y_{ij}$) observed in images obtained by capturing a measurement target region including a point A.

FIG. 4 schematically illustrates a two-dimensional spatial distribution (referred to below as the displacement distribution) of displacement components ($\delta x_{ij}$, $\delta y_{ij}$) observed in a specific region in images obtained by capturing a measurement target region. As shown in FIG. 4, when the displacement components ($\delta x_{ij}$, $\delta y_{ij}$) of respective coordinates of the specific region calculated by the displacement distribution calculation unit 11 are represented as displacement vectors, the displacement components can be represented as combined components obtained by combining displacement components ($\delta x$, $\delta y$) accompanying the movement ($\Delta x$, $\Delta y$) in the surface direction observed in a uniform direction and size over the entire screen, displacement components ($\delta z x_{ij}$, $\delta z y_{ij}$) accompanying the movement ($\Delta z$) in the normal direction observed as a group of radial vectors from the imaging center of the screen, and surface displacement components ($\delta\delta x_{ij}$, $\delta\delta y_{ij}$) associated with the deformation and displacement of the surface of the measurement target region.

Next is considered a method of calculating the displacement vector components ($\delta x$, $\delta y$) accompanying the movement ($\Delta x$, $\Delta y$) in the surface direction. As shown in FIG. 4, the displacement component ($\delta x$, $\delta y$) accompanying the movement ($\Delta x$, $\Delta y$) in the surface direction is basically a component observed in a uniform direction and size over the entire screen, such as an offset. Therefore, from the displacement distribution calculated by the displacement distribution calculation unit 11, the displacement component measured at respective coordinates of a specific region centered on the imaging center is treated as a displacement vector to which plus or minus is added depending on the direction of displacement. The displacement vectors at the respective target coordinates are all added up and an average is obtained. Thereby, the displacement vector components ($\delta x$, $\delta y$) accompanying the movement ($\Delta x$, $\Delta y$) in the surface direction can be calculated.

Next this method is described in detail. First, as shown in FIG. 4, when the displacement distribution is treated as a displacement vector component, a displacement vector group, in which the displacement vector components ($\delta x$, $\delta y$) accompanying the movement ($\Delta x$, $\Delta y$) in the surface direction and the displacement components ($\delta z x_{ij}$, $\delta z y_{ij}$) accompanying the movement ($\Delta z$) in the normal direction are combined, is observed. Here, in the specific region centered on the imaging center, as shown in FIG. 4, the displacement vector components ($\delta z x_{ij}$, $\delta z y_{ij}$) accompanying the movement ($\Delta z$) in the normal direction are observed as radial displacement vectors.

Therefore, when all the displacement vectors of the respective pixels in the region centered on the imaging center of the screen are added, the displacement vector components ($\delta z x_{ij}$, $\delta z y_{ij}$), which are radial displacement vector components and occur accompanying the movement ($\Delta z$) in the normal direction, are cancelled. As a result, there remain only components obtained by adding together the displacement vector components ($\delta x$, $\delta y$) accompanying the movement ($\Delta x$, $\Delta y$) in the surface direction and the surface displacement components ($\delta\delta x_{ij}$, $\delta\delta y_{ij}$).

Here, commonly, the surface displacement components ($\delta\delta x_{ij}$, $\delta\delta y_{ij}$) due to deformation and displacement occurring on the surface of a structure are in many cases considered to be sufficiently small in comparison to the displacement vector components ($\delta x$, $\delta y$) accompanying the movement ($\Delta x$, $\Delta y$) in the surface direction. Therefore, the components obtained by adding together the surface displacement components ($\delta\delta x_{ij}$, $\delta\delta y_{ij}$) are very small in comparison to the components obtained by adding together the very small displacement vector components (δx, δy) accompanying the movement (Δx, Δy) in the surface direction, so the components obtained by adding together the surface displacement components (δδx$_{ij}$, δδy$_{ij}$) can be ignored. Therefore, it can be considered that most of the remaining components are due to the displacement vector components (δx, δy) accompanying the movement (Δx, Δy) in the surface direction.

Therefore, by calculating the average of the remaining components, it is possible to calculate the displacement vector components (δx, δy) accompanying the movement (Δx, Δy) in the surface direction. That is, the displacement vector components (δx, δy) accompanying the movement (Δx, Δy) in the surface direction can be calculated by the above-described method.

Next, a method of calculating the displacement vector components (δzx$_{ij}$, δzy$_{ij}$) accompanying the movement (Δz) in the normal direction will be described. A state is considered in which only the displacement vector components (δzx$_{ij}$, δzy$_{ij}$) accompanying the movement (Δz) in the normal direction are occurring. If the movement amount Δz of a specific region is constant in the specific region, a size R(i, j) of the vector is a value proportional to the distance from the imaging center, as indicated in the following Equation 5. Also, where the constant of proportionality is set to k as indicated in the following Equation 6, Equation 5 can also be expressed as Equation 7.

$$R(i, j) = \sqrt{\delta zx_{ij}^2 + \delta zy_{ij}^2} = f\left(\frac{1}{L-\Delta z} - \frac{1}{L}\right)\sqrt{i^2 + j^2} \quad \text{[Equation 5]}$$

$$k = f\left(\frac{1}{L-\Delta z} - \frac{1}{L}\right) \quad \text{[Equation 6]}$$

$$R(i, j) = k\sqrt{i^2 + j^2} \quad \text{[Equation 7]}$$

On the other hand, the displacement distribution actually calculated by the displacement distribution calculation unit 11 is composed of the combined vector components (δx$_{ij}$, δy$_{ij}$) (indicated in FIG. 4 by arrows of thickest solid lines) as shown in FIG. 4. As understood from FIG. 4, the combined vector components (δx$_{ij}$, δy$_{ij}$) include the displacement vector components (δzx$_{ij}$, δzy$_{ij}$) accompanying the movement (Δz) in the normal direction (indicated in FIGS. 3 and 4 by arrows of medium solid lines), the displacement vector components (δx, δy) accompanying the movement (Δx, Δy) in the surface direction (indicated in FIGS. 3 and 4 by arrows of thick solid lines), and the surface displacement components (δδx$_{ij}$, δδy$_{ij}$) accompanying deformation and displacement on the surface of the measurement target region (indicated in FIGS. 3 and 4 by arrows of thin solid lines).

Of these combined vector components (δx$_{ij}$, δy$_{ij}$), those obtained by subtracting the displacement vector components (δx, δy) accompanying the movement (Δx, Δy) in the surface direction, previously calculated, correspond to combined vectors obtained by combining the displacement vector components (δzx$_{ij}$, δzy$_{ij}$) accompanying the movement (Δz) in the normal direction and the surface displacement components (δδx$_{ij}$, δδy$_{ij}$). Therefore, when a combined vector obtained by combining the displacement vector components (δzx$_{ij}$, δzy$_{ij}$) accompanying the movement (Δz) in the normal direction and the surface displacement components (δδx$_{ij}$, δδy$_{ij}$) of certain coordinates (i, j) is represented as R$_{mes}$(i, j), these can be represented as shown in Equation 8 below, and these values can be calculated.

$$R_{mes}(i,j) = \sqrt{(\delta xij - \delta x)^2 + (\delta yij - \delta y)^2}$$

$$R_{mes}(i,j) = \sqrt{(\delta zxij - \delta\delta xij)^2 + (\delta zyij - \delta\delta yij)^2} \quad \text{[Equation 8]}$$

Incidentally, the surface displacement components (δδx$_{ij}$, δδy$_{ij}$) are in many cases considered to be sufficiently small in comparison to the displacement vector components (δx, δy) accompanying the movement (Δx, Δy) in the surface direction and the displacement vector components (δzx$_{ij}$, δzy$_{ij}$) accompanying the movement (Δz) in the normal direction. Therefore, here, the discussion focuses on the displacement vector components (δx, δy) accompanying the movement (Δx, Δy) in the surface direction and the displacement vector components (δzx$_{ij}$, δzy$_{ij}$) accompanying the movement (Δz) in the normal direction, which are the dominant components. In this case, Equation 8 can be expressed as Equation 9.

$$R_{mes}(i,j) = \sqrt{(\delta zxij)^2 + (\delta zyij)^2} \quad \text{[Equation 9]}$$

In this case, R$_{mes}$(i, j) at the coordinates (i, j) can be treated as being substantially equal to the displacement vector components (δzx$_{ij}$, δzy$_{ij}$) accompanying the movement (Δz) in the normal direction. At this time, the displacement vector components when the movement amount Δz in the normal direction is given is represented by R(i, j) as shown in Equations 6 to 8.

Therefore, from Equation 9, using the size R$_{mes}$(i, j) of the displacement vector calculated from the displacement components (δx$_{ij}$, δy$_{ij}$) at respective coordinates calculated by the displacement distribution calculation unit 11 and the displacement vector components (δx, δy) accompanying the movement (Δx, Δy) in the surface direction, it is possible to estimate a ratio of enlargement/reduction of the size R(i, j) of the displacement vector due to the displacement vector components (δzx$_{ij}$, δzy$_{ij}$) accompanying the movement (Δz) in the normal direction. Specifically, the magnification of R(i, j) can be estimated by calculating a proportional constant k that minimizes an evaluation function E(k) shown in the following Equation 10.

$$E(k) = \sum_{i,j} \{R_{mes}(i, j) - R(i, j, k)\}^2 \quad \text{[Equation 10]}$$

Therefore, in this example embodiment, the movement amount calculation unit 12 calculates the proportional constant k by applying a least squares method to the above Equation 10. Note that, other than a sum of squares of the difference between R$_{mes}$(i, j) and R(i, j) shown in the above Equation 10, a sum of absolute values, a sum of other powers, or the like, may be used as the evaluation function E(k).

Then, the movement amount calculation unit 12 calculates the movement amount Δz by applying the calculated proportional constant k as a constant indicating the ratio of enlargement/reduction in the above Equation 7.

As described above, the movement amount calculation unit 12 can calculate the movement amounts Δx, Δy, and Δz in three directions of the measurement target region.

The movement amount calculation unit 12 can also calculate the movement amount of the measurement target region more accurately by using the calculated movement amounts Δx, Δy, and Δz of the measurement target region. Specifically, the calculated movement amount Δz is substituted into the above Equation 4 to calculate the displacement vector components (δzx$_{ij}$, δzy$_{ij}$) accompanying the movement (Δz) in the normal direction. Further, by subtracting the calculated displacement vector components ($\delta z x_{ij}$, $\delta z y_{ij}$) accompanying the movement (Δz) in the normal direction from the displacement vectors ($\delta x_{ij}$, $\delta y_{ij}$) calculated as the displacement distribution by the displacement distribution calculation unit 11, the displacement vector components ($\delta x'$,$\delta y'$) accompanying the movement (Δx, Δy) in the surface direction are calculated (see above Equations 1 and 2).

Note that, here as well, calculation is performed using a condition that the surface displacement components ($\delta\delta x_{ij}$, $\delta\delta y_{ij}$) are considered to be sufficiently small in comparison to the displacement vector components ($\delta x$, $\delta y$) accompanying the movement (Δx, Δy) in the surface direction and the displacement vector components ($\delta z x_{ij}$, $\delta z y_{ij}$) accompanying the movement (Δz) in the normal direction.

Afterward, the movement amount calculation unit 12 substitutes the calculated displacement vector components ($\delta x'$,$\delta y'$) accompanying the movement in the surface direction and the movement amount Δz into the above Equation 3 to calculate movement amounts Δx' and Δy' in the surface direction of the measurement target region. The movement amounts Δx' and Δy' in the surface direction of the measurement target region calculated in this way are calculated more accurately than the movement amounts Δx and Δy that were previously calculated.

Furthermore, using the calculated movement amounts Δx' and Δy' in three directions of the measurement target region, it is possible to calculate Δz' by again applying the above Equation 10, and thus to calculate movement amounts Δx',Δy' and Δz' of the measurement target region in three directions. This value is calculated with higher accuracy than when calculated as the movement amounts Δx, Δy, and Δz, and Δx',Δy', and Δz. The above processing may be repeated a predetermined number of times, or may be repeated until convergence to a certain value range.

The movement amount in the surface direction of the measurement target region and the movement amount in the normal direction of the measurement target region calculated by the movement amount calculation unit 12 respectively are obtained for each image capturing instance of the captured time-series images. Therefore, each movement amount can be handled as vibration information in which the time interval of image capturing is used as a sampling interval.

The surface displacement calculation unit 13 uses the movement amount (Δx, Δy) in the surface direction of the measurement target region and the movement amount (Δz) in the normal direction of the measurement target region calculated by the movement amount calculation unit 12 to calculate the surface displacement components ($\delta\delta x_{ij}$, $\delta\delta y_{ij}$) of the measurement target region based on the displacement distribution (displacement vectors ($\delta x_{ij}$, $\delta y_{ij}$)) calculated by the displacement distribution calculation unit 11.

According to FIG. 4, in order to calculate the surface displacement components ($\delta\delta x_{ij}$, $\delta\delta y_{ij}$), it is understood that the displacement components generated by the movement amounts (Δx, Δy, Δz) in the measurement target region may be subtracted from the displacement vectors ($\delta x_{ij}$, $\delta y_{ij}$) calculated by the displacement distribution calculation unit 11. That is, the surface displacement components ($\delta\delta x_{ij}$, $\delta\delta y_{ij}$) can be calculated by using the following Equations 11 and 12.

[surface displacement components ($\delta\delta x_{ij}$,$\delta\delta y_{ij}$)]=
 [displacement vectors ($\delta x_{ij}$,$\delta y_{ij}$)calculated by the displacement distribution calculation unit 11]−
 [displacement components ($\delta x$,$\delta y$)accompanying movement (Δx,Δy) in the surface direction]−
 [displacement components ($\delta z x_{ij}$,$\delta z y_{ij}$)accompanying movement (Δz) in the normal direction]   [Equation 11]

$$(\delta\delta x_{ij},\delta\delta y_{ij})=(\delta x_{ij}-(\delta x+\delta z y_y),\delta y_{ij}-(\delta y+\delta z y_{ij}))$$ [Equation 12]

According to above Equations 11 and 12, the displacement vector components ($\delta x$, $\delta y$) accompanying the movement (Δx, δy) in the surface direction and the displacement vector components ($\delta z x_{ij}$, $\delta z y_{ij}$) accompanying the movement (Δz) in the normal direction may be subtracted from the displacement vectors ($\delta x_{ij}$, $\delta y_{ij}$) calculated by the displacement distribution calculation unit 11. Therefore, the surface displacement calculation unit 13, using the movement amounts (Δx, Δy, Δz) in the measurement target region, for each pixel in the processing image, calculates the displacement vector components ($\delta x$, $\delta y$) accompanying the movement (Δx, Δy) in the surface direction and the displacement vector components ($\delta z x_{ij}$, $\delta z y_{ij}$) accompanying the movement (Δz) in the normal direction, and subtracts each of these from the displacement vectors ($\delta x_{ij}$, $\delta y_{ij}$) calculated by the displacement distribution calculation unit 11. Thus, in the displacement distribution ($\delta x_{ij}$, $\delta y_{ij}$) calculated by the displacement distribution calculation unit 11, the displacement components generated by the movement amounts in the measurement target region is corrected, and only the surface displacement components in the measurement target region are obtained.

Also, as shown in FIG. 2, in this example embodiment, the displacement component detecting apparatus 10 includes the deterioration state determination unit 14 in addition to the displacement distribution calculation unit 11, the movement amount calculation unit 12, and the surface displacement calculation unit 13 described above. The deterioration state determination unit 13 is configured to determine a deterioration state of the object 30 based on at least one of a surface displacement component in the measurement target region, a movement amount in the surface direction of the measurement target region, and a movement amount in the normal direction of the measurement target region.

In this example embodiment, the deterioration state determination unit 14 uses the surface displacement components ($\delta\delta x_{ij}$, $\delta\delta y_{ij}$) or the surface displacement distribution of the measurement target region calculated by the surface displacement calculation unit 13 to determine, for example, which in the states shown in FIGS. 5a to 5d the object 30 is. Here, various abnormalities occurring in the object 30, and the state of the object 30 when an abnormality occurs, will be described with reference to FIGS. 5a to 5d.

FIGS. 5a to 5d illustrate abnormal states of a structure, and respectively show abnormal states. Also, the object 30 shown in FIGS. 5a to 5d is a beam-like structure supported at two points, and a side view of the object 30 is shown in each drawing. Furthermore, in FIGS. 5a to 5d, a rectangular figure shown below the object 30 schematically shows a displacement distribution.

Figure 5A:
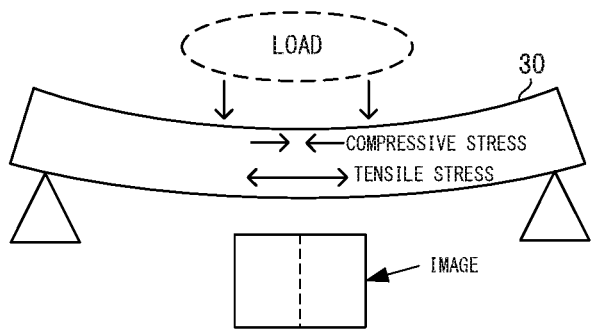
FIGS. 5a to 5d illustrate abnormal states of a structure, and respectively show different states.

Incidentally, if the object 30 has no abnormality and the target object 30 is healthy, as shown in FIG. 5a, with respect to a perpendicular load from the upper face of the object 30, compressive stress acts on the upper face of the structure and tensile stress acts on the lower face. In this case, the displacement distribution is divided according to the direction of the stress.

Figure 5B:
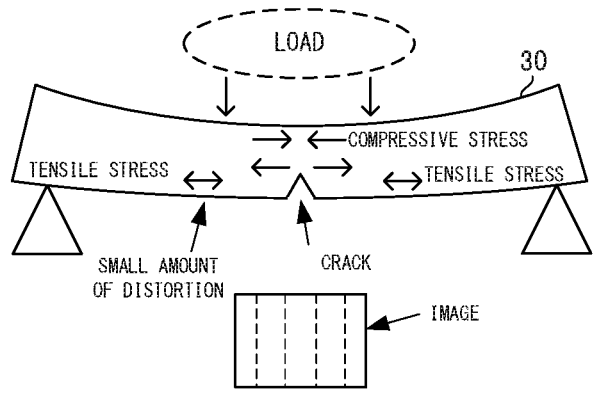

On the other hand, as shown in FIG. 5b, when a crack exists on the lower face of the object 30, the opening displacement due to the load becomes large in the cracked portion. On the other hand, in the vicinity of the cracked portion, since no stress is transmitted by the cracked portion, the displacement distribution is in a state different from the healthy state shown in FIG. 5a.

Figure 5C:
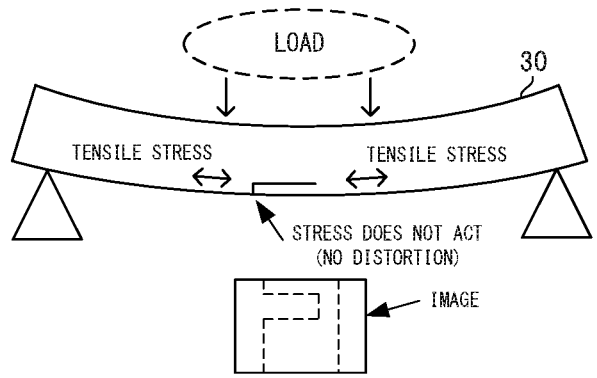

Also, as shown in FIG. 5c, in a case where peeling exists inside the lower face side of the object 30, when observing from the lower face of the object 30, an external appearance similar to the case where a crack has occurred as shown in FIG. 5b is observed. However, when peeling exists, stress is not transmitted between the peeling portion and the portion above. Therefore, before and after applying the load, the peeling portion only moves in parallel in a certain direction by a certain amount, and partial displacement does not occur in the peeling portion. Therefore, the displacement distribution is divided according to the peeling portions before and after applying the load.

Figure 5D:
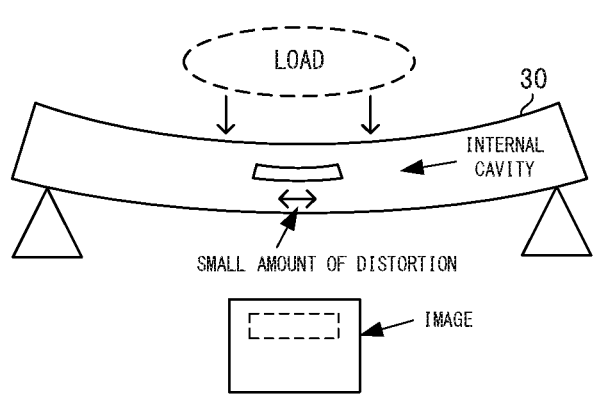

Also, as shown in FIG. 5d, when a cavity exists inside the object 30, the stress on the lower face of the object 30 is small because the internal cavity prevents the transmission of stress. Therefore, because the displacement specified based on the displacement distribution is also small, the displacement distribution is divided according to the internal cavity.

Conventionally, surface displacement components including information regarding deformation, displacement, and stress of the surface of a structure as described above are difficult to directly be observed from the displacement distribution calculated by the displacement distribution calculation unit 11 by three-dimensional movement in the measurement target region. However, by correcting the displacement distribution calculated by the displacement distribution calculation unit 11 with the surface displacement calculation unit 13, and using the calculated surface displacement components ($\delta\delta x_{ij}$, $\delta\delta y_{ij}$) of the measurement target region, it is possible to obtain information regarding deformation, displacement, and stress of the surface of the structure, so the above sort of deterioration state determination is possible, and it is possible to output a determination result.

In this example embodiment, the deterioration state determination unit 14 applies the surface displacement components ($\delta\delta x_{ij}$, $\delta\delta y_{ij}$) of the measurement target region, the movement amount ($\Delta x$, $\Delta y$) in the surface direction of the measurement target region, and the movement ($\Delta z$) in the normal direction of the measurement target region to preset rules, then determines the deterioration state of the object 30 and outputs the determination result. An example of a rule is a rule that determines the state of deterioration from the values of respective parameters, where the parameters are any of, or a combination of, the surface displacement components ($\delta\delta x_{ij}$, $\delta\delta y_{ij}$) of the measurement target region and the movement amount ($\Delta x$, $\Delta y$, $\Delta z$) in the measurement target region.

For example, in structures such as road bridges and railway bridges, it is possible to determine, based on information regarding the maximum amplitude and frequency of pitch and roll when free vibration occurs or when some kind of load is applied and forced vibration occurs, whether the deterioration state is a state in which abnormal vibration is occurring, or whether the structure rigidity is not reduced, or whether the state is changing (see Reference Documents 1 and 2). On the other hand, the deterioration state determination unit 14 uses the movement amount ($\Delta x$, $\Delta y$, $\Delta z$) in the measurement target region calculated by the movement amount calculation unit 12 from the time-series images obtained by capturing the measurement target region of the object 30 to obtain time-series movement amount information, that is, vibration information. Further, the deterioration state determination unit 14 is able to analyze the vibration of the roll and the pitch from the vibration information and evaluate the maximum amplitude and frequency to determine whether the state is a deterioration state, and to determine how much the state has changed from a healthy state.

Reference Document 1: Japan Road Association: Road Bridge Specifications and Explanations [Steel Bridge Edition]

Reference Document 2: Railway Technical Research Institute, Railway Structure Maintenance Standards and Explanations [Structure Edition: Steel/Synthetic Structures]

As another example, the movement of the object 30 itself may be evaluated as the movement amount ($\Delta x$, $\Delta y$, $\Delta z$) of the measurement target region. In particular, in the case of the configuration of this example embodiment, regarding the movement amount $\Delta z$ in the normal direction of the measurement target region, when a load is applied by a vehicle passing over a bridge serving as the object 30, the movement amount $\Delta z$ in the normal direction can be evaluated as deflection that occurs in the object 30. Utilizing this, when the deflection of the object 30 is large, it can be judged that a large load has been applied to a large bridge. From this information, for example, a deterioration determination based on the accumulated fatigue damage degree (see Reference Document 3) can also be performed. This is a method of determining how much the accumulated fatigue damage has progressed by counting in consideration of the size of a load and the number of repetitions of the load. The movement amount $\Delta z$ in the normal direction can be used as a value representing the size of the load. The number of repetitions is counted assuming that there is the same degree of load if the movement amount $\Delta z$ is the same. Thus it is possible to determine the accumulated fatigue damage degree as the deterioration state.

Reference Document 3: http://bunken.rtri.or.jp/PDF/cdroms1/0001/2009/0001003186.pdf As another example, there is a method of determining the deterioration state by combining the movement amount ($\Delta x$, $\Delta y$, $\Delta z$) of the measurement target region and the surface displacement component of the measurement target region. For example, assuming that the movement amount $\Delta z$ in the normal direction of the measurement target region can be used as a value representing the size of the load, when the movement amount $\Delta z$ in the normal direction of the measurement target region takes a large value, it is possible to judge that the deformation and displacement and the like that occur on the surface of the measurement target region tend to increase. Therefore, by preferentially observing the surface displacement component in the processing image when the movement amount $\Delta z$ in the normal direction of the measurement target region takes a large value, it is possible to determine a pattern of deterioration that appears in the surface displacement component or the surface displacement distribution, as shown more simply in FIGS. 5a to 5d.

As another example, even in a case where the observation location in the same structure is different, the state can be determined by relative comparison to results when the same degree of load is applied (when a vehicle with the same weight passes over the structure).

In the above methods, there was conventionally no method capable of performing measurement and determination with the same apparatus configuration, the same apparatus cost and the same measurement cost, but these methods can be realized using the configuration of this example embodiment.

[Apparatus Operation]

Figure 6:
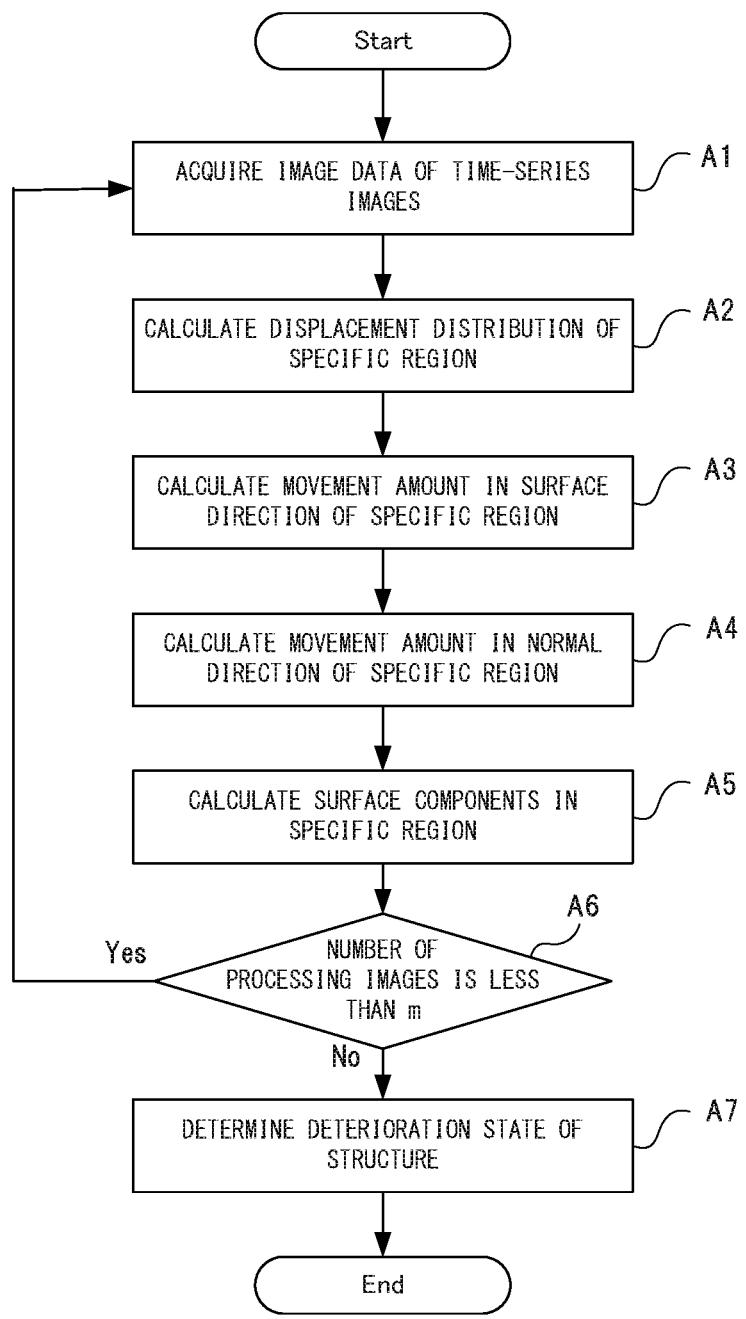
FIG. 6 is a flowchart showing operation of the displacement component detection apparatus according to an example embodiment of the invention.

Next, operation of the displacement component detection apparatus 10 according to this example embodiment will be described with reference to FIG. 6. FIG. 6 is a flowchart showing operation of the displacement component detection apparatus according to an example embodiment of the invention. The following description refers to FIGS. 1 to 5 as appropriate. Also, in this example embodiment, a displacement component detection method is implemented by operating the displacement component detection apparatus 10. Thus, the description of the displacement component detection method in this example embodiment can be replaced with the description of operation of the displacement component detection apparatus 10 below.

As shown in FIG. 6, first, in the displacement component detection apparatus 10, the displacement distribution calculation unit 11 acquires image data of time-series images obtained by capturing images of the measurement target region of the object 30, which is output from the image capturing device 20 (step A1). Next, the displacement distribution calculation unit 11 calculates a displacement distribution in a region corresponding to the measurement target region in the images using the image data of the time-series images (step A2).

Next, the movement amount calculation unit 12 calculates the movement amount (Δx, Δy) in the surface direction of the measurement target region based on the displacement distribution and the image capturing information (step A3). Then, the movement amount calculation unit 12 calculates the movement amount Δz in the normal direction of the measurement target region based on the displacement distribution and the image capturing information (step A4). Note that steps A3 and A4 may be executed simultaneously.

Next, the surface displacement calculation unit 13, using the movement amount (Δx, Δy) in the surface direction of the measurement target region calculated in step A3 and the movement amount Δz in the normal direction of the measurement target region calculated in step A4, calculates the surface displacement components ($\delta\delta x_{ij}$, $\delta\delta y_{ij}$) in the measurement target region from the displacement distribution calculated in step A2 (step A5).

Next, the surface displacement calculation unit 13 determines whether the number of processing images for which the surface components ($\delta\delta x_{ij}$, $\delta\delta y_{ij}$) in the measurement target region have been calculated is less than a threshold value m (step A6). The threshold value m is appropriately set by an experiment or the like performed in advance.

If the result of the determination in step A6 is that the number of processing images is less than the threshold value m, the surface displacement calculation unit 13 instructs the displacement distribution calculation unit 11 to execute step A1 again. In this case, steps A1 to A5 are executed again for another processing image.

On the other hand, if the result of the determination in step A6 is that the number of processing images is not less than the threshold value m (when the number has become the threshold value m), the surface displacement calculation unit 13 instructs the deterioration state determination unit 14 to perform a determination. Thus, the deterioration state determination unit 14 determines the deterioration state of the object 30 based on, with respect to each processing image, the surface components ($\delta\delta x_{ij}$, $\delta\delta y_{ij}$) in the measurement target region, the movement amount in the surface direction of the measurement target region, and the movement amount in the normal direction of the measurement target region (step A7).

[Modified Examples]

Also, in this example embodiment, steps A3, A4, and A5 shown in FIG. 6 may be executed a plurality of times for one processing image. When this mode is adopted, the accuracy of calculating the movement amount in the surface direction and the normal direction can be improved. Also, when this mode is adopted, each step shown in FIG. 7 is executed.

Figure 7:
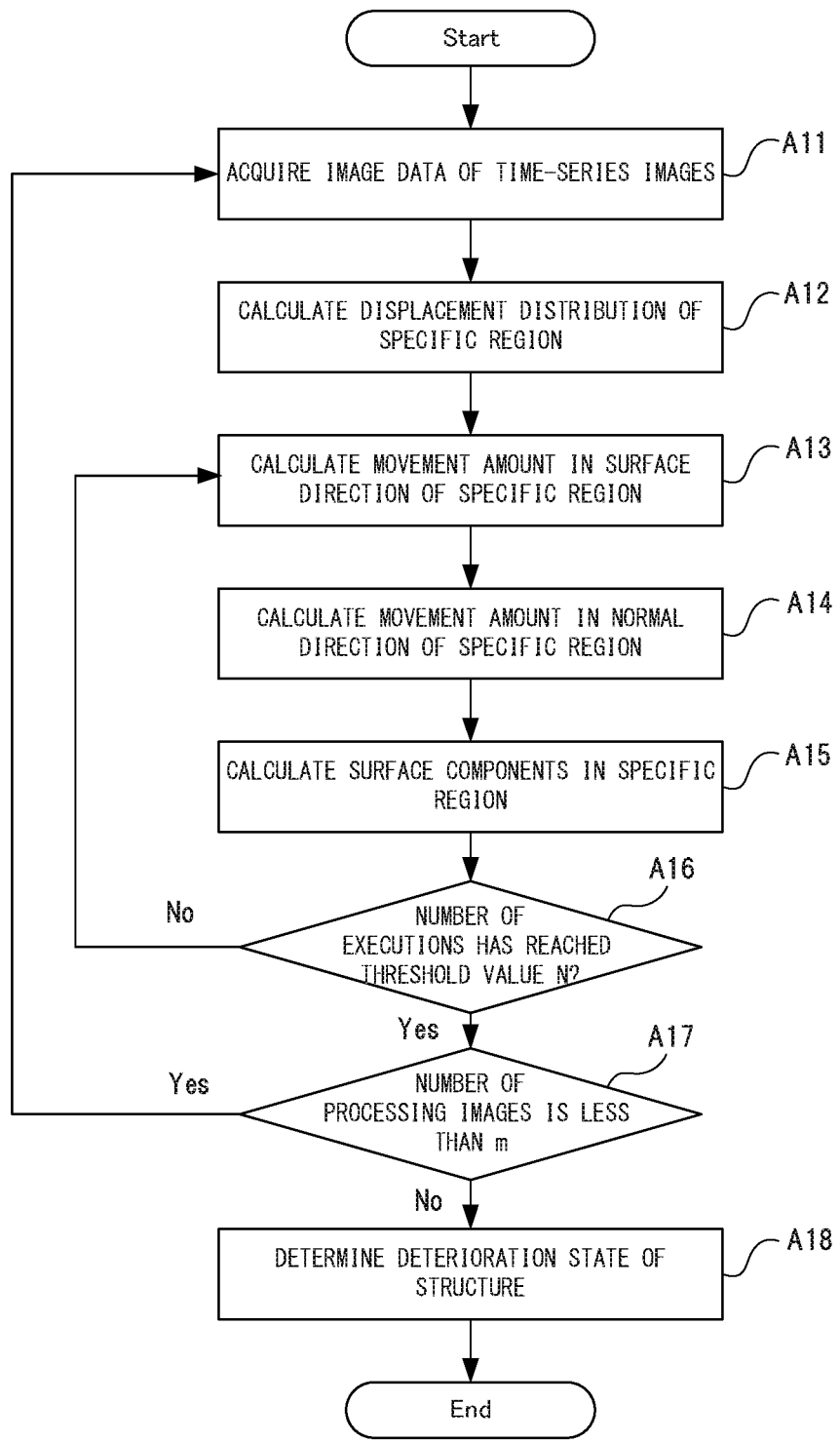
FIG. 7 is a flowchart showing another example of operation of the displacement component detection apparatus according to an example embodiment of the invention.

FIG. 7 is a flowchart showing another example of operation of the displacement component detection apparatus according to an example embodiment of the invention. As shown in FIG. 7, first, in the displacement component detection apparatus 10, the displacement distribution calculation unit 11 acquires image data of time-series images of the measurement target region of the object 30 (step A11), and uses this image data to calculate the displacement distribution in a region corresponding to the measurement target region in the images (step A12). Steps A11 and A12 are the same steps as steps A1 and A2 shown in FIG. 6.

Next, based on the displacement distribution and the image capturing information, the movement amount calculation unit 12 calculates the movement amount (Δx, Δy) in the surface direction of the measurement target region (step A13), and then calculates the movement amount Δz in the normal direction of the measurement target region (step A14). Steps A13 and A14 are the same steps as steps A3 and A4 shown in FIG. 6.

Next, the surface displacement calculation unit 13, using the movement amount (Δx, Δy) in the surface direction of the measurement target region calculated in step A13 and the movement amount Δz in the normal direction of the measurement target region calculated in step A14, calculates the surface displacement components ($\delta\delta x_{ij}$, $\delta\delta y_{ij}$) in the measurement target region from the displacement distribution calculated in step A12 (step A15). Step A15 is the same step as step A5 shown in FIG. 6.

Next, the surface displacement calculation unit 13 determines whether the number of executions of steps A13 to A15 has reached a threshold value N (step A16). The threshold value N is appropriately set by an experiment or the like performed in advance.

If the result of the determination in step A16 is that the number of executions of steps A13 to A15 has not reached the threshold value N, the surface displacement calculation unit 13 instructs the movement amount calculation unit 12 to execute step A13 again. Thus, steps A13, A14, and A15 are executed again. However, a mode may also be adopted in which, in this case, only one of steps A13 and A14 is executed.

Specifically, when step A15 has already been executed, the movement amount calculation unit 12, using the movement amount Δz in the normal direction of the measurement target region already calculated in step A14, again calculates the movement amount (Δx',Δy') in the surface direction of the measurement target region. Also, in this case, the surface displacement calculation unit 13, using the recalculated movement amount (Δx',Δy') in the surface direction of the measurement target region, and the movement amount Δz in the normal direction of the measurement target region, calculates the surface displacement component in the measurement target region again.

On the other hand, if the result of the determination in step A16 is that the number of executions of steps A13 to A15 has reached the threshold value N, the surface displacement calculation unit 13 determines whether the number of processing images for which the surface displacement components ($\delta\delta x_{ij}$, $\delta\delta y_{ij}$) in the measurement target region has been calculated is less than the threshold value m (step A17). Step A17 is the same step as step A6 shown in FIG. 6.

If the result of the determination in step A17 is that the number of processing images is less than the threshold value m, the surface displacement calculation unit 13 instructs the displacement distribution calculation unit 11 to execute step A11 again. In this case, steps A11 to A16 are executed again.

On the other hand, if the result of the determination in step A17 is that the number of processing images for which the surface displacement components ($\delta\delta x_{ij}$, $\delta\delta y_{ij}$) in the measurement target region have been calculated is less than the threshold value m (when the number has become the threshold value m), the surface displacement calculation unit 13 instructs the deterioration state determination unit 14 to perform a determination. Thus, the deterioration state determination unit 14 determines the deterioration state of the object 30 based on, with respect to each processing image, the surface components ($\delta\delta x_{ij}$, $\delta\delta y_{ij}$) in the measurement target region, the movement amount in the surface direction of the measurement target region, and the movement amount in the normal direction of the measurement target region (step A18). Step A18 is the same step as step A7 shown in FIG. 6.

[Advantageous Effects of Example Embodiment]

As described above, according to this example embodiment, even when the object 30 has moved due to an external force, the displacement distribution in the measurement target region is corrected according to the movement, so an accurate displacement distribution is calculated. Therefore, according to this example embodiment, it is possible to accurately determine the deterioration state of the object 30.

Also, in this example embodiment, the arrangement of the image capturing device 20 is not limited to the example shown in FIG. 1. In this example embodiment, the image capturing device 20 may be arranged so as to capture an image of the structure to be image-captured from the side, or may be arranged so as to capture an image of the structure from an oblique direction. In the former case, the measurement target region is a region parallel to the vertical direction as described above. In the latter case, the orientation of the captured image is converted and processing is performed by image processing based on the position and the image capturing angle of the image capturing device 20.

[Program]

A program according to this example embodiment may be a program that causes a computer to execute steps A1 to A7 shown in FIG. 6, or steps A11 to A18 shown in FIG. 7. By installing this program in the computer and executing the program, the displacement component detection apparatus and the displacement component detection method according to this example embodiment can be realized. In this case, a CPU (Central Processing Unit) of the computer performs processing to function as the displacement distribution calculation unit 11, the movement amount calculation unit 12, the surface displacement calculation unit 13, and the deterioration state determination unit 14.

Also, the program according to this example embodiment may be executed by a computer system constructed using a plurality of computers. In this case, for example, each computer may respectively function as any of the displacement distribution calculation unit 11, the movement amount calculation unit 12, the surface displacement calculation unit 13, and the deterioration state determination unit 14.

Figure 8:
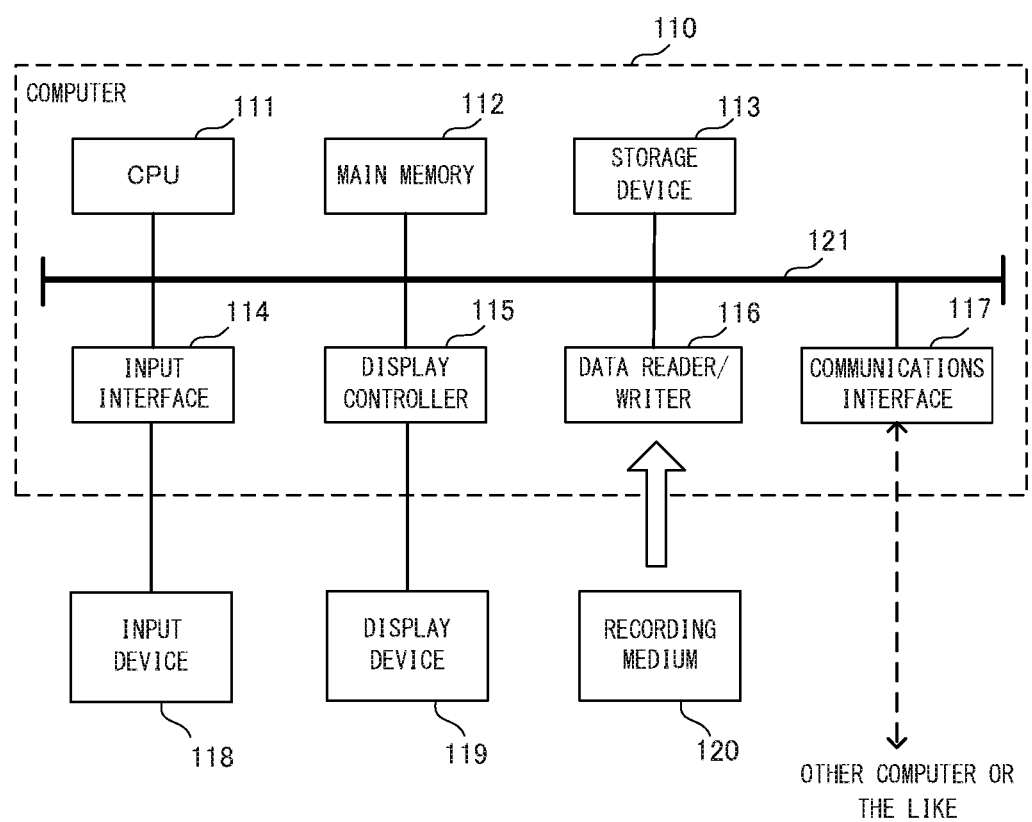
FIG. 8 is a block diagram showing an example of a computer that realizes the displacement component detection apparatus according to an example embodiment of the invention.

Here, a computer that realizes the displacement component detection apparatus 10 by executing the program according to this example embodiment will be described with reference to FIG. 8. FIG. 8 is a block diagram showing an example of a computer that realizes the displacement component detection apparatus according to an example embodiment of the invention.

As shown in FIG. 8, the computer 110 includes a CPU 111, a main memory 112, a storage device 113, an input interface 114, a display controller 115, a data reader/writer 116, and a communications interface 117. These units are each connected so as to be capable of performing data communications with each other through a bus 121.

The CPU 111 opens the program (code) according to this example embodiment, which has been stored in the storage device 113, in the main memory 112 and performs various operations by executing the program in a predetermined order. The main memory 112 is typically a volatile storage device such as a DRAM (Dynamic Random Access Memory). Also, the program according to this example embodiment is provided in a state stored in a computer-readable recording medium 120. Note that the program according to this example embodiment may be distributed on the Internet, which is connected through the communications interface 117.

Also, other than a hard disk drive, a semiconductor storage device such as a flash memory can be given as a specific example of the storage device 113. The input interface 114 mediates data transmission between the CPU 111 and an input device 118, which may be a keyboard or mouse. The display controller 115 is connected to a display device 119, and controls display on the display device 119.

The data reader/writer 116 mediates data transmission between the CPU 111 and the recording medium 120, and executes reading of a program from the recording medium 120 and writing of processing results in the computer 110 to the recording medium 120. The communications interface 117 mediates data transmission between the CPU 111 and other computers.

Also, general-purpose semiconductor storage devices such as CF (Compact Flash (registered trademark)) and SD (Secure Digital), a magnetic recording medium such as a Flexible Disk, or an optical recording medium such as a CD-ROM (Compact Disk Read-Only Memory) can be given as specific examples of the recording medium 120.

Also, instead of a computer in which a program is installed, the displacement component detection apparatus 10 according to this example embodiment can also be realized by using hardware corresponding to each unit. Furthermore, a portion of the displacement component detection apparatus 10 may be realized by a program, and the remaining portion realized by hardware.

Some portion or all of the example embodiments described above can be realized according to (supplementary note 1) to (supplementary note 15) described below, but the below description does not limit the invention.

(Supplementary Note 1)

A displacement component detection apparatus according to an example aspect of the invention includes:

a displacement distribution calculation unit configured to calculate, from time-series images of a measurement target region of an object output from an image capturing device configured to capture the images of the measurement target region, a displacement distribution in a region that corresponds to the measurement target region in the images;

a movement amount calculation unit configured to calculate, based on the displacement distribution and image capturing information when capturing the measurement target region, a movement amount in a surface direction of the measurement target region and a movement amount in a normal direction of the measurement target region; and a surface displacement calculation unit configured to calculate, from the displacement distribution, a surface displacement component in the measurement target region, using the movement amount in the surface direction of the measurement target region and the movement amount in the normal direction of the measurement target region.

(Supplementary Note 2)

The displacement component detection apparatus according to supplementary note 1, further including:

a deterioration state determination unit configured to determine a deterioration state of the object based on at least one of a surface displacement component in the measurement target region, a movement amount in the surface direction of the measurement target region, and a movement amount in the normal direction of the measurement target region.

(Supplementary Note 3)

The displacement component detection apparatus according to supplementary note 2, wherein the displacement distribution calculation unit calculates, with respect to each of the time-series images, a displacement distribution in a region corresponding to the measurement target region in the image, the movement amount calculation unit calculates, with respect to each of the time-series images, a movement amount in the surface direction of the measurement target region and a movement amount in the normal direction of the measurement target region, the surface displacement calculation unit calculates, with respect to each of the time-series images, a surface displacement component in the measurement target region, and the deterioration state determination unit determines a deterioration state of the object when a surface displacement component in the measurement target region, a movement amount in the surface direction of the measurement target region, and a movement amount in the normal direction of the measurement target region have been obtained with respect to a set number of the time-series images.

(Supplementary Note 4)

The displacement component detection apparatus according to any of supplementary notes 1 to 3, wherein the movement amount calculation unit, when a surface displacement component in the measurement target region has been calculated by the surface displacement calculation unit, using a movement amount in the normal direction of the measurement target region that is already calculated, recalculates any one or both of a movement amount in the surface direction of the measurement target region and a movement amount in the normal direction of the measurement target region, and the surface displacement calculation unit, using any one or both of the movement amount in the surface direction of the measurement target region and the movement amount in the normal direction of the measurement target region that were recalculated, recalculates the surface displacement component in the measurement target region.

(Supplementary Note 5)

The displacement component detection apparatus according to any of supplementary notes 1 to 4, wherein the surface direction of the measurement target region includes a direction corresponding to a horizontal direction of the time-series images, and a direction corresponding to a perpendicular direction of the time-series images.

(Supplementary Note 6)

A displacement component detection method, including:

(a) a step of calculating, from time-series images of a measurement target region of an object output from an image capturing device configured to capture the images of the measurement target region, a displacement distribution in a region that corresponds to the measurement target region in the images;

(b) a step of calculating, based on the displacement distribution and image capturing information when capturing the measurement target region, a movement amount in a surface direction of the measurement target region and a movement amount in a normal direction of the measurement target region; and (c) a step of calculating, from the displacement distribution, a surface displacement component in the measurement target region, using the movement amount in the surface direction of the measurement target region and the movement amount in the normal direction of the measurement target region.

(Supplementary Note 7)

The displacement component detection method according to supplementary note 6, further including:

(d) a step of determining a deterioration state of the object based on at least one of a surface displacement component in the measurement target region, a movement amount in the surface direction of the measurement target region, and a movement amount in the normal direction of the measurement target region.

(Supplementary Note 8)

The displacement component detection method according to supplementary note 7, wherein in the (a) step, with respect to each of the time-series images, a displacement distribution in a region corresponding to the measurement target region in the image is calculated, in the (b) step, with respect to each of the time-series images, a movement amount in the surface direction of the measurement target region and a movement amount in the normal direction of the measurement target region are calculated, in the (c) step, with respect to each of the time-series images, a surface displacement component in the measurement target region is calculated, and in the (d) step, a deterioration state of the object is determined when a surface displacement component in the measurement target region, a movement amount in the surface direction of the measurement target region, and a movement amount in the normal direction of the measurement target region have been obtained with respect to a set number of the time-series images.

(Supplementary Note 9)

The displacement component detection method according to any of supplementary notes 6 to 8, further including:

(e) a step of, when a surface displacement component in the measurement target region has been calculated by the (c) step, using a movement amount in the normal direction of the measurement target region that is already calculated, recalculating any one or both of a movement amount in the surface direction of the measurement target region and a movement amount in the normal direction of the measurement target region, and (f) a step of, using any one or both of the movement amount in the surface direction of the measurement target region and the movement amount in the normal direction of the measurement target region that were recalculated in the (e) step, recalculating the surface displacement component in the measurement target region.

(Supplementary Note 10)

The displacement component detection method according to any of supplementary notes 6 to 9, wherein the surface direction of the measurement target region includes a direction corresponding to a horizontal direction of the time-series images, and a direction corresponding to a perpendicular direction of the time-series images.

(Supplementary Note 11)

A computer-readable recording medium that includes a program recorded thereon, the program including instructions that cause a computer to carry out:

(a) a step of calculating, from time-series images of a measurement target region of an object output from an image capturing device configured to capture the images of the measurement target region, a displacement distribution in a region that corresponds to the measurement target region in the images;

(b) a step of calculating, based on the displacement distribution and image capturing information when capturing the measurement target region, a movement amount in a surface direction of the measurement target region and a movement amount in a normal direction of the measurement target region; and (c) a step of calculating, from the displacement distribution, a surface displacement component in the measurement target region, using the movement amount in the surface direction of the measurement target region and the movement amount in the normal direction of the measurement target region.

(Supplementary Note 12)

The computer-readable recording medium according to supplementary note 11, the program further including instructions that cause a computer to carry out:

(d) a step of determining a deterioration state of the object based on at least one of a surface displacement component in the measurement target region, a movement amount in the surface direction of the measurement target region, and a movement amount in the normal direction of the measurement target region.

(Supplementary Note 13)

The computer-readable recording medium according to supplementary note 12, wherein in the (a) step, with respect to each of the time-series images, a displacement distribution in a region corresponding to the measurement target region in the image is calculated, in the (b) step, with respect to each of the time-series images, a movement amount in the surface direction of the measurement target region and a movement amount in the normal direction of the measurement target region are calculated, in the (c) step, with respect to each of the time-series images, a surface displacement component in the measurement target region is calculated, and in the (d) step, a deterioration state of the object is determined when a surface displacement component in the measurement target region, a movement amount in the surface direction of the measurement target region, and a movement amount in the normal direction of the measurement target region have been obtained with respect to a set number of the time-series images.

(Supplementary Note 14)

The computer-readable recording medium according to any of supplementary notes 11 to 13, the program further including instructions that cause a computer to carry out:

(e) a step of, when a surface displacement component in the measurement target region has been calculated by the (c) step, using a movement amount in the normal direction of the measurement target region that is already calculated, recalculating any one or both of a movement amount in the surface direction of the measurement target region and a movement amount in the normal direction of the measurement target region, and (f) a step of, using any one or both of the movement amount in the surface direction of the measurement target region and the movement amount in the normal direction of the measurement target region that were recalculated in the (e) step, recalculating the surface displacement component in the measurement target region.

(Supplementary Note 15)

The computer-readable recording medium according to any of supplementary notes 11 to 14, wherein the surface direction of the measurement target region includes a direction corresponding to a horizontal direction of the time-series images, and a direction corresponding to a perpendicular direction of the time-series images.

INDUSTRIAL APPLICABILITY

As described above, according to the invention, it is possible, in a structure that involves movement in a three-dimensional direction and vibration, to determine the state of the structure with influence due to this movement and vibration eliminated. The invention is useful in various fields, such as maintenance and management, and abnormality detection, of infrastructure structures such as bridges, roads, buildings, and facilities.

REFERENCE SIGNS LIST

10 Displacement component detection apparatus
11 Displacement distribution calculation unit
12 Movement amount calculation unit
13 Surface displacement calculation unit
14 Deterioration state determination unit
20 Image capturing device
21 Fixture
30 Structure
110 Computer
111 CPU
112 Main memory
113 Storage device
114 Input interface
115 Display controller
116 Data reader/writer
117 Communications interface
118 Input device
119 Display device
120 Recording medium
121 Bus

What is claimed is:

1. A displacement component detection apparatus comprising:
a central processing unit (CPU) including a processor and a memory, the CPU being configured to:
calculate, from time-series images of a measurement target region of an object, a displacement distribution in a region that corresponds to the measurement target region in the images;

calculate, based on the displacement distribution and image capturing information from capturing the measurement target region, a movement amount in a surface direction of the measurement target region and a movement amount in a normal direction of the measurement target region; and calculate, from the displacement distribution, a surface displacement component in the measurement target region, which is generated by the movement amount in the surface direction of the measurement target region and the movement amount in the normal direction of the measurement target region, using the calculated displacement distribution by subtracting the movement amount in the surface direction of the measurement target region and the movement amount in the normal direction of the measurement target region from the displacement distribution in the region that corresponds to the measurement target region in the images.

2. The displacement component detection apparatus according to claim 1, wherein the CPU is further configured to:

determine a deterioration state of the object based on at least one of the surface displacement component in the measurement target region, the movement amount in the surface direction of the measurement target region, and the movement amount in the normal direction of the measurement target region.

3. The displacement component detection apparatus according to claim 2, wherein the CPU is further configured to:

calculate the displacement distribution in the region corresponding to the measurement target region in the image, with respect to each of the time-series images;

calculated the movement amount in the surface direction of the measurement target region and the movement amount in the normal direction of the measurement target region, with respect to each of the time-series images;

calculate the surface displacement component in the measurement target region, with respect to each of the time-series images; and determine the deterioration state of the object when the surface displacement component in the measurement target region, the movement amount in the surface direction of the measurement target region, and the movement amount in the normal direction of the measurement target region have been obtained with respect to a set number of the time-series images.

4. The displacement component detection apparatus according to claim 1, wherein the CPU is further configured to:

when a surface displacement component in the measurement target region has been calculated by the surface displacement calculation unit, using the movement amount in the normal direction of the measurement target region that has already been calculated, recalculate any one or both of the movement amount in the surface direction of the measurement target region and the movement amount in the normal direction of the measurement target region, and using any one or both of the movement amount in the surface direction of the measurement target region and the movement amount in the normal direction of the measurement target region that were recalculated, recalculate the surface displacement component in the measurement target region.

5. The displacement component detection apparatus according to claim 1, wherein the surface direction of the measurement target region includes a direction corresponding to a horizontal direction of the time-series images, and a direction corresponding to a perpendicular direction of the time-series images.

6. A displacement component detection method, comprising:

calculating, from time-series images of a measurement target region of an object, a displacement distribution in a region that corresponds to the measurement target region in the images;

calculating, based on the displacement distribution and image capturing information from capturing the measurement target region, a movement amount in a surface direction of the measurement target region and a movement amount in a normal direction of the measurement target region; and calculating, from the displacement distribution, a surface displacement component in the measurement target region, which is generated by the movement amount in the surface direction of the measurement target region and the movement amount in the normal direction of the measurement target region, using the calculated displacement distribution by subtracting the movement amount in the surface direction of the measurement target region and the movement amount in the normal direction of the measurement target region from the displacement distribution in the region that corresponds to the measurement target region in the images.

7. The displacement component detection method according to claim 6, further comprising:

determining a deterioration state of the object based on at least one of the surface displacement component in the measurement target region, the movement amount in the surface direction of the measurement target region, and the movement amount in the normal direction of the measurement target region.

8. The displacement component detection method according to claim 7, wherein the displacement distribution in the region corresponding to the measurement target region in the image is calculated, with respect to each of the time-series images, the movement amount in the surface direction of the measurement target region and the movement amount in the normal direction of the measurement target region are calculated, with respect to each of the time-series images, the surface displacement component in the measurement target region is calculated, with respect to each of the time-series images, and the deterioration state of the object is determined when a the surface displacement component in the measurement target region, the movement amount in the surface direction of the measurement target region, and the movement amount in the normal direction of the measurement target region have been obtained with respect to a set number of the time-series images.

9. The displacement component detection method according to claim 6, further comprising:

when a surface displacement component in the measurement target region has been calculated, using the movement amount in the normal direction of the measurement target region that has already been calculated, recalculating any one or both of the movement amount in the surface direction of the measurement target region and the movement amount in the normal direction of the measurement target region, and using any one or both of the movement amount in the surface direction of the measurement target region and the movement amount in the normal direction of the measurement target region that were recalculated, recalculating the surface displacement component in the measurement target region.

10. The displacement component detection method according to claim 6, wherein the surface direction of the measurement target region includes a direction corresponding to a horizontal direction of the time-series images, and a direction corresponding to a perpendicular direction of the time-series images.

11. A non-transitory computer-readable recording medium that includes a program recorded thereon, the program including instructions that cause a computer to carry out:

calculating, from time-series images of a measurement target region of an object a displacement distribution in a region that corresponds to the measurement target region in the images;

calculating, based on the displacement distribution and image capturing information from capturing the measurement target region, a movement amount in a surface direction of the measurement target region and a movement amount in a normal direction of the measurement target region; and calculating, from the displacement distribution, a surface displacement component in the measurement target region, which is generated by the movement amount in the surface direction of the measurement target region and the movement amount in the normal direction of the measurement target region, using the calculated displacement distribution by subtracting the movement amount in the surface direction of the measurement target region and the movement amount in the normal direction of the measurement target region from the displacement distribution in the region that corresponds to the measurement target region in the images.

12. The non-transitory computer-readable recording medium according to claim 11, the program further including instructions that cause a computer to carry out:

determining a deterioration state of the object based on at least one of the surface displacement component in the measurement target region, the movement amount in the surface direction of the measurement target region, and the movement amount in the normal direction of the measurement target region.

13. The non-transitory computer-readable recording medium according to claim 12, wherein the displacement distribution in the region corresponding to the measurement target region in the image is calculated, with respect to each of the time-series images, the movement amount in the surface direction of the measurement target region and the movement amount in the normal direction of the measurement target region are calculated, with respect to each of the time-series images, the surface displacement component in the measurement target region is calculated, with respect to each of the time-series images, and the deterioration state of the object is determined when the surface displacement component in the measurement target region, the movement amount in the surface direction of the measurement target region, and the movement amount in the normal direction of the measurement target region have been obtained with respect to a set number of the time-series images.

14. The non-transitory computer-readable recording medium according to claim 11, the program further including instructions that cause a computer to carry out:

when a surface displacement component in the measurement target region has been calculated using the movement amount in the normal direction of the measurement target region that has already been calculated, recalculating any one or both of the movement amount in the surface direction of the measurement target region and the movement amount in the normal direction of the measurement target region, and using any one or both of the movement amount in the surface direction of the measurement target region and the movement amount in the normal direction of the measurement target region that were recalculated, recalculating the surface displacement component in the measurement target region.

15. The non-transitory computer-readable recording medium according to claim 11, wherein the surface direction of the measurement target region includes a direction corresponding to a horizontal direction of the time-series images, and a direction corresponding to a perpendicular direction of the time-series images.

* * * * *